E. E. ROUSE.
SPRING TIRE FOR MOTOR VEHICLES.
APPLICATION FILED MAY 16, 1914.
1,122,540.
Patented Dec. 29, 1914.
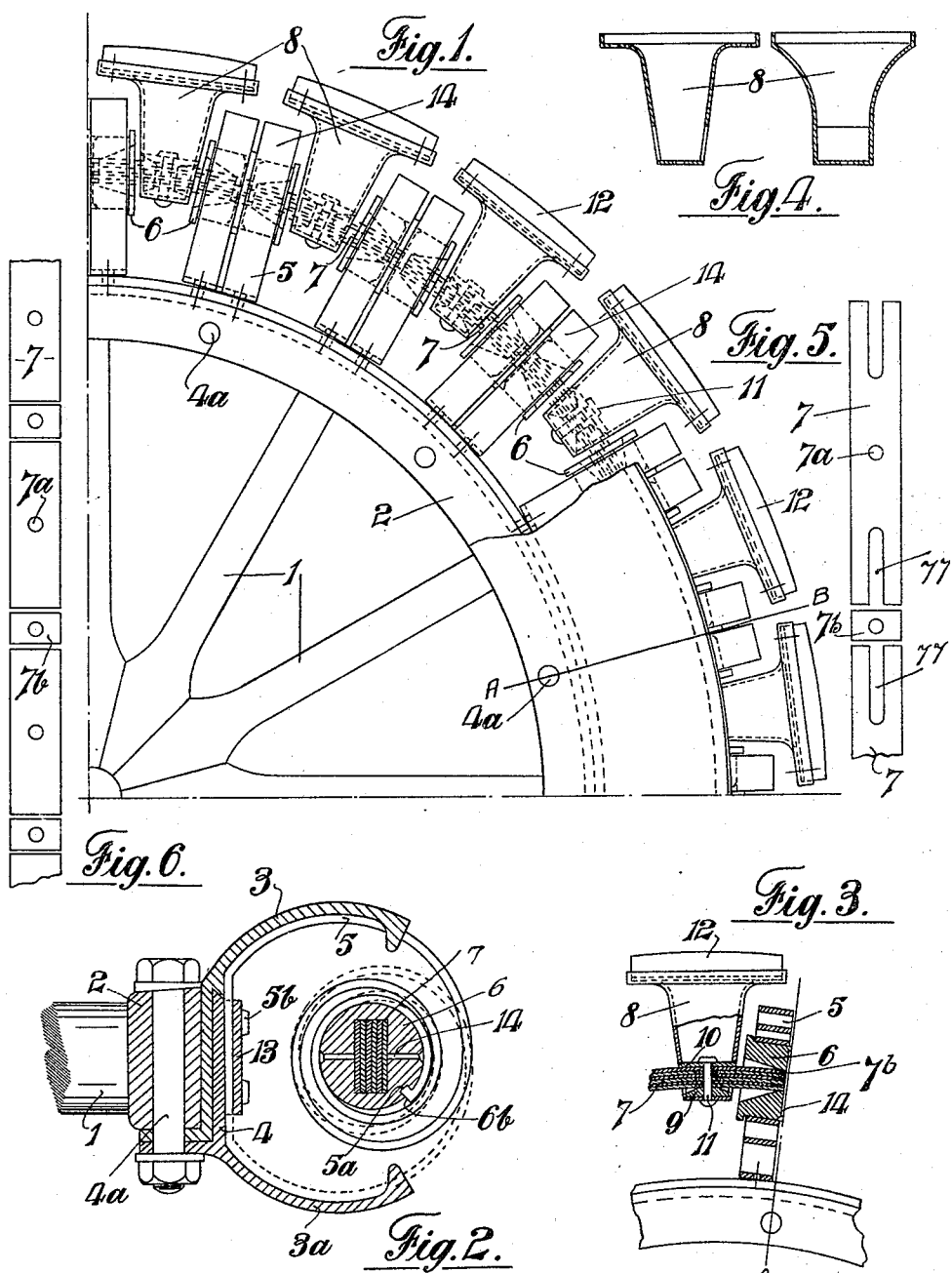

UNITED STATES PATENT OFFICE.

ERNEST EDWARD ROUSE, OF LONDON, ENGLAND.

SPRING-TIRE FOR MOTOR-VEHICLES.

1,122,540.  Specification of Letters Patent.  Patented Dec. 29, 1914.

Application filed May 16, 1914. Serial No. 838,969.

*To all whom it may concern:*

Be it known that I, ERNEST EDWARD ROUSE, residing at 37 Queen Victoria Street, London, E. C., England, have invented certain new and useful Improvements in Spring-Tires for Motor-Vehicles; and I do hereby declare the following to be a full, clear, and exact description of the invention, such as will enable others skilled in the art to which it appertains to make and use the same.

This invention relates to an improved spring tire for vehicle wheels, and has for its object *inter alia*, to provide a resilient tread. This object is secured by elastically suspending a flexible and laminated circumferential spring band adapted to carry a plurality of equi-spaced treads that are housed in rigid engagement with the band, the suspension of said band being such that driving or lateral strains are absorbed by the suspending device, and lateral movement that otherwise might be destructive is taken by rigid felly flanges. While there are several methods whereby these improvements can find constructional expression, the preferred arrangement is shown in the accompanying drawings in which:—

Figure 1 is a part elevation of a wheel constructed in accordance with the invention, Fig. 2 is a cross section on line A. B. Fig. 1 to an enlarged scale, Fig. 3 is a section of the flexible band housing and tread parts in a plane with the wheel periphery, Fig. 4 shows detail of tread housings, Fig. 5 shows detail of one form of lamination, Fig. 6 shows an alternative form of lamination.

In the drawings, a wooden wheel 1, or metal wheel of the Sankey type, is provided with a felly 2. Disposed on such felly, are detachable felly flanges 3, 3ª, one of said parts 3ª, being provided with an engaging flange 4, recessed into the substance of the inner flange of felly flange 3. The felly flange 3ª, being the only part designedly detachable, the felly flange 3 may be fixed to the felly by means of screws circumferentially placed. In such case, the loose felly flange 3ª, is secured to the felly 2 by means of rim bolts 4ª placed at intervals as shown in Figs. 1 and 2, or the whole resilient tire may be removed by withdrawal of the bolts 4ª. Within such rim parts are secured spirally coiled springs 5, transversely disposed, such springs being spaced in pairs equally around the wheel, the parts of any one such pair being mounted so that the outer coil of each spring bears against opposed sides of the rim pieces 3 and 3ª respectively, so that lateral strains or torque tend to find balance between the movements of the springs so opposed. The springs 5 are flat spiral springs, that is to say their side edges are arranged in parallel planes, but any other approved form of spring may be used in carrying out this invention. These transverse springs 5 carry flanged bushes 6, through which bushes the laminated band 7 passes. The bushes 6 have a rectangular opening through them, the upper and lower sides being beveled or inclined toward a central and parallel seat portion, so as to provide a riding surface or seat for the band 7, and yet allow relative movement of the band to the bushes. The band 7 is composed of a plurality of laminations or leaves which are disposed one upon the other, and are in one method of arranging the laminations of said band, secured together by rivets 14 traversing the seatings of the bushes 6. This laminated spring band 7 carries between its points of support the floating tread housings 8, terminated by pyramidal chairs 9, through which the band 7 is passed and to which it is secured by means of rivets 11, and a seating washer or plate 10 being placed over the band and passing through the walls of the tread housing which are perforated to accommodate both band and plate. The laminations of the band 7 are arranged end to end in relatively short sections as shown in Fig. 5, and the rivets 14 of the bushes 6, and 11 of the tread housings 8, pass through the rivet holes 7ª of alternate layers respectively, so that the said layers break joint and are bonded and no break in continuity occurs in any two contiguous layers radially. A washer 7ᵇ is interposed between the ends of each lamination as shown in section in Figs. 5 and 6. The spring sections or leaves 7 shown in Fig. 5 differ from those shown in Fig. 6 in having longitudinal slots 77 in their end portions to lighten them. The number of laminations, or in other words, the thickness of the band, will depend upon the load carried, and be in strict proportion therewith, the material employed for such band 7 being a steel, such as is suitable for suspension springs in motor car chassis, and should be tempered to an extent that permits circumferential distortion to be resisted. The laminations in any one series may be arranged as shown, or in some other equally convenient manner so long as relative motion is possible between contiguous sections.

Each transverse spring 5 is formed with a talon 5ᵃ, which is recessed into a groove 6ᵃ in the bush 6, the talon being either left soft or annealed after the spring is hardened or tempered. The bushes 6 are thereby anchored to the springs 5, and any lateral rotational effect due to road obstacles on the interspaced tread parts thereby resisted. The tread housings 8 may be, and preferably are, made as stampings from sheet metal, which stampings can be made from plate and edge welded to form a box, the tread parts 12 which are of balata, hard rubber, or the like, being secured within the upper retaining portion of the box by screws or similar fastening devices. The springs 5 are secured to the rim parts by means of rivets, screws, or the like 5ᵇ, a plate or washer 13 being provided to distribute the anchoring effect.

In operation it will be observed that the tread parts 8 and 12 are in floating relationship to the wheel proper, owing to their disposition on the band 7, and that since the band 7 is also elastically secured to the wheel through the intermediation of the springs 5, a very considerable resilience is possible between the tread parts and the relatively rigid wheel felly. If this relative movement were possible in the plane of the tread only, a considerable and possibly even destructive transverse strain would be thrown upon the band anchoring when the wheel was subjected to turning movements, but owing to the fact that the band itself is mounted within and subject to the flexion of the transverse springs 5, there is an even and compensating absorption of lateral strains which relieves the band 7 and allows the tread parts to accommodate themselves to road or steering conditions. Again, assuming that the wheel load causes a definite deflection of the band at point of road contact, then the laminations are so disposed and arranged that relative movement of the band layers is not prevented, but allowed to take place, the alternate layers having at road contact relative movement according to deflection. By these means a resilient tire is constructed that can be made from assembled units, each unit being like its felly and repeated in sequence around the wheel periphery, the degree of resilience being a factor that is within the manufacturer's power to control.

It will be observed that whatever deflection or cross strain is placed upon the band at any one point, it is distributed in successively diminishing degrees to the laminations on both sides of the deflection, so that those adjacent portions also deflected assist in causing the band to regain its normal shape, after the disturbing influence has passed, and this effect very materially adds to the resiliency of the tire.

I claim:—

1. In a resilient tire, the combination, with a wheel rim, of springs secured at intervals to the wheel rim, a laminated spring band formed of a plurality of superposed leaves and supported by the said springs and encircling the wheel rim, and tread pieces secured to the spring band between the said springs.

2. In a resilient tire, the combination, with a wheel rim, of springs secured at intervals to the wheel rim, supporting bushes carried by the said springs and provided with holes having tapering end portions, a spring band secured in the middle portions of the said holes and encircling the wheel rim, and tread pieces secured to the spring band between the said springs.

3. In a resilient tire, the combination, with a wheel rim, of spiral springs arranged in pairs and secured at intervals to the wheel rim, the springs constituting each pair of springs being secured to opposite sides of the rim and projecting crosswise of it in opposite directions, a spring band supported by the said pairs of springs and encircling the wheel rim, and tread pieces secured to the spring band between the said pairs of springs.

4. In a resilient tire, the combination, with a felly, of a wheel rim formed in sections and provided with side flanges, springs secured at intervals against the said flanges and arranged between them, a laminated spring band supported by the said springs and encircling the wheel rim, and tread pieces secured to the spring band between the said springs.

In testimony whereof I affix my signature, in presence of two witnesses.

ERNEST EDWARD ROUSE.

Witnesses:
  W. E. ROGERS,
  A. H. MATTHEWS.